C. W. BIERBACH.
Wagon Wheel.
No. 91,204.
Patented June 15, 1869.
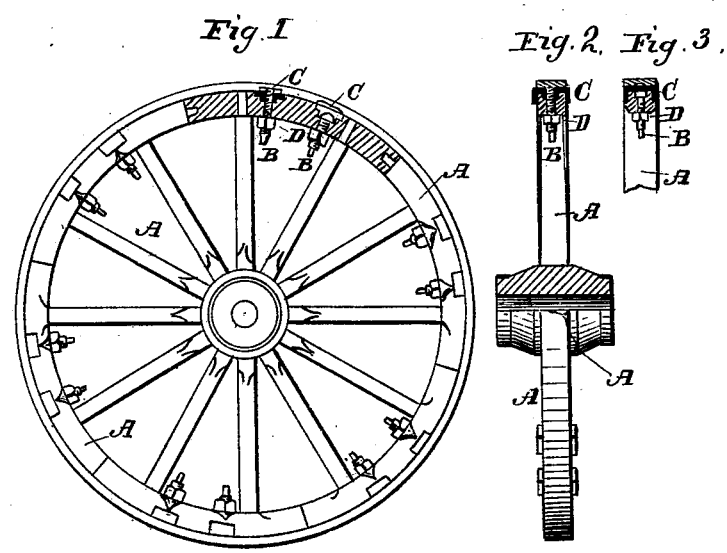

United States Patent Office.

CHARLES W. BIERBACH, OF MILWAUKEE, WISCONSIN.

Letters Patent No. 91,204, dated June 15, 1869.

IMPROVED WAGON-WHEEL.

The Schedule referred to in these Letters Patent and making part of the same.

*To whom it may concern:*

Be it known that I, CHARLES W. BIERBACH, of Milwaukee, in the county of Milwaukee, and State of Wisconsin, have invented a new and useful Improvement in Wagon-Wheels; and I do declare that the following is a true and accurate description thereof, reference being had to the accompanying drawings, and to the letters of reference marked thereon, and being a part of this specification.

Figure 1 is a plan view of my invention, partially in section.

Figure 2 is an elevation, partially in section.

Figure 3 is a section, showing a different construction of the clamp.

Like letters indicate like parts in each figure.

The nature of this invention relates to an improvement in wagon or carriage-wheels; and consists in constructing the same so that the tire may be tightened and the wood-work kept compact, by the use of proper clamps, screws, and jaw-nuts, as hereinafter more fully described.

A, in the drawings, represents a wheel, with my invention attached.

Between the spokes that are in each felloe, and passing through the same, as near the spokes as convenient, I place screw-bolts B, the outer ends of which pass through the threaded clamps C, and enter an elongated recess in the under side of the tire.

This recess does not extend entirely around the tire, but each is of sufficient length to render it impossible to adjust the tire without having the bolts operate as intended.

D is a jam-nut, placed upon each bolt, for the purpose of holding the same in place after being adjusted.

The clamps C may be constructed so as to set even with the edge of the tire and felloes, or so as to project a little beyond, as shown.

The advantage of the latter construction is that the projecting clamp, as soon as it strikes an obstruction, such as a railroad-track, or others, lifts the wheel so that it will ride over it without breaking or straining the parts of the wheel.

The object of placing the bolts and clamp so near the spokes is to give more strength to the wheel.

The operation of this invention may be explained as follows:

Having placed the clamps, bolts, and jam-nuts in proper position, and the tire being heated, I place the same around the wheel, in such a manner that the bolts B will enter the recesses in the tire.

I then screw in the bolts, which forces the tire outward and the wood-work toward the centre.

After adjusting the tire as may be desired, I then screw down the jam-nuts D close upon the felloes, thus securing the whole, and making a very strong wheel.

Should the wood-work shrink, by use and exposure to the weather, the tire may be tightened without removing it from the wheel to shorten it, by operating the bolts, &c., as described.

What I claim as my invention, and desire to secure by Letters Patent, is—

The screw-clamps C, bolts B, and jam-nuts D, in connection with a recessed tire, when arranged and operating substantially as described, and for the purposes specified.

CHARLES W. BIERBACH.

Witnesses:
I. S. CLARK,
GEO. W. LAKIN.